QUADRATURE STRIPPING NETWORK

Filed Oct. 25, 1956 3 Sheets-Sheet 1

INVENTOR.
GUNNAR WENNERBERG,
BY
Perry E. Turner
AGENT.

QUADRATURE STRIPPING NETWORK

Filed Oct. 25, 1956 3 Sheets-Sheet 2

INVENTOR.
GUNNAR WENNERBERG,
BY
Perry E. Turner
AGENT

May 2, 1961 G. WENNERBERG 2,982,867

QUADRATURE STRIPPING NETWORK

Filed Oct. 25, 1956 3 Sheets-Sheet 3

INVENTOR.
GUNNAR WENNERBERG,
BY
Perry E. Turner
AGENT.

United States Patent Office 2,982,867

Patented May 2, 1961

2,982,867

QUADRATURE STRIPPING NETWORK

Gunnar Wennerberg, Pacific Palisades, Calif., assignor to Lear, Incorporated, Santa Monica, Calif.

Filed Oct. 25, 1956, Ser. No. 618,368

15 Claims. (Cl. 307—88.5)

Figure 1:
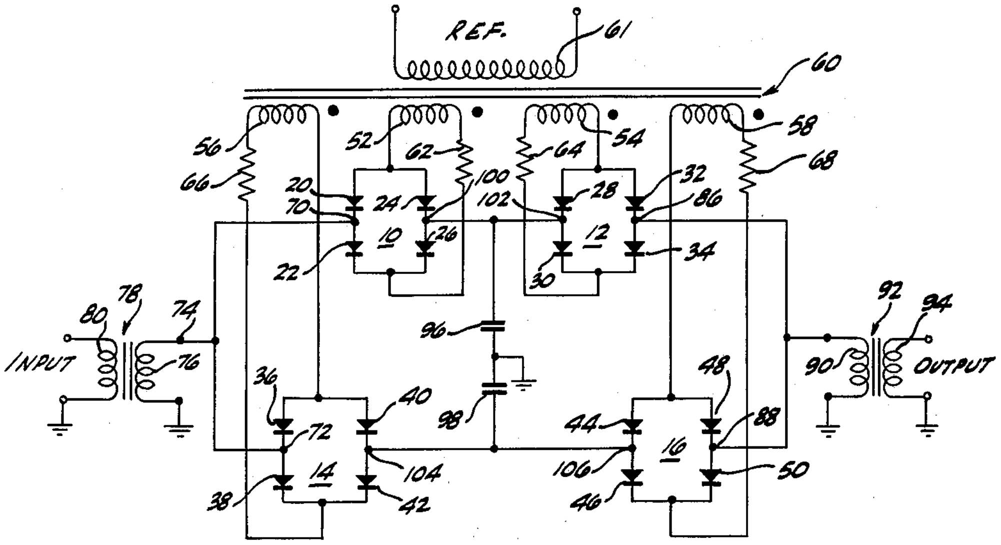

This invention relates to servo amplifiers operable in response to two or more input signals, and more particularly to means for developing a square wave voltage proportionate to a component of cyclical input signals which is in phase with a reference voltage, which is insensitive to differences in the waveform of the input signals or the effect of quadrature components, and which is also capable of receiving D.-C. inputs.

In many servo amplifier applications, a command signal comprising a modulated carrier wave is applied to the amplifier to develop an output signal for use in moving a device to a desired position. Follow-up signals representing the position of the device are applied to the amplifier to oppose the command signal. When the device is in the desired position, the command signal and follow-up signals should be equal in magnitude and opposite in phase. However, as is well known, it is rare that the two signals are truly opposite in phase under such conditions, and a quadrature component exists which, if left uncorrected, would result in saturation of the amplifier. In addition, differences in the waveforms of the signals also tend to cause saturation of the amplifier. Attempts have been made to counteract or minimize the effects of quadrature and waveform variations, and have resulted in the use of additional equipment, often of elaborate design, which unduly tax space and weight limitations in aircraft. Further, such apparatus has the distinct disadvantage that the operations of component networks thereof, e.g., discriminator and filter circuits, considerably delay the response of the amplifier. Also, such equipment contributes additional points of circuit failure, and hence increased maintenance problems.

It is a first object of this invention to provide an improved quadrature stripping network in which a substantially square wave output voltage corresponding to input signals is developed with minimum delay.

It is another object of this invention to provide a quadrature stripping network for producing a substantially square wave voltage, wherein waveform variations and/or quadrature effects in input signals produce no error in the shape of the square wave voltage, and characterized by minimum delay in developing such voltage.

It is still another object of this invention to provide circuit means to produce a square wave voltage, which ignores or is insensitive to waveform variations or quadrature effects in input signals, in contrast to prior art arrangements for counteracting or minimizing such effects.

It is a further object of this invention to provide, for servo amplifier systems, a quadrature stripping network for producing for producing a square wave voltage from an alternating or D.-C. voltage source, which is unaffected by variations in wave form and the effects of quadrature components of the A.-C. voltage, and which contributes to a servo amplifier system which is lighter in weight and occupies less space that similar servo amplifier systems.

Briefly, a quadrature stripping network in accordance with the invention comprises two pairs of switching devices, the devices of each pair being coupled respectively to an input circuit and an output circuit, and respective storage elements such as capacitors connected to ground and to the switching devices of the respective pairs. By means of a reference voltage, the devices of each pair and also the input devices and output devices, are rendered alternately conducting. When each device coupled to the input circuit is conducting, the associated capacitor receives a charge representing a component of the signal voltage in the input circuit which is in phase with the reference voltage; on the succeeding half cycle of the reference voltage, the other device in the pair is conducting, and through it the charge on the capacitor is delivered to the output circuit as a half cycle of a square wave, the magnitude of which represents the average of the in-phase component. A quadrature component in the input signal cannot effect the output, because a zero net charge on the capacitor results therefrom. To develop half of the square wave, only one pair of switching devices and one storage element are utilized.

Figure 2:
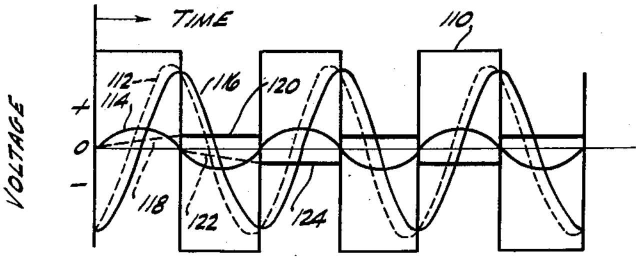
Figure 3:
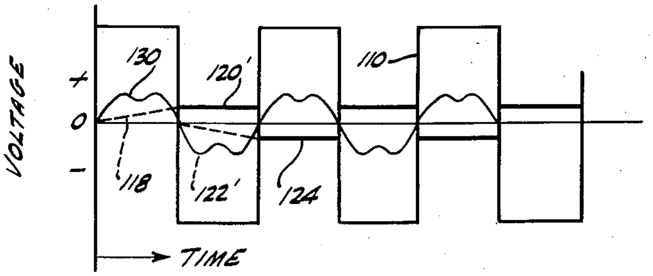
Figure 4:
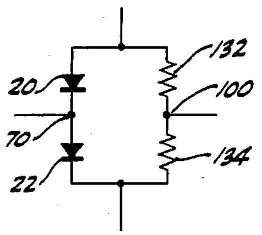
Figure 5:
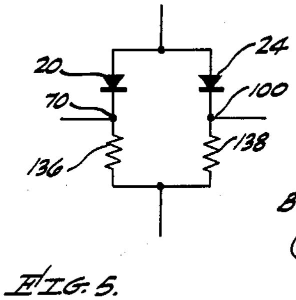

The above and other objects and advantages of this invention will be apparent from the following description, taken in conjunction with the accompanying drawings, in which a preferred embodiment of the invention is illustrated by way of example. The scope of the invention is pointed out in the appended claims. In the drawings, Fig. 1 is a schematic diagram of a quadrature stripping net work employing diodes, in accordance with this invention, Figs. 2 and 3 illustrate wave forms to aid in explaining the operation of the network of Fig. 1, Figs. 4 and 5 are schematic diagrams to illustrate respective modifications of the diode arrangements.

Figures 6, 7:
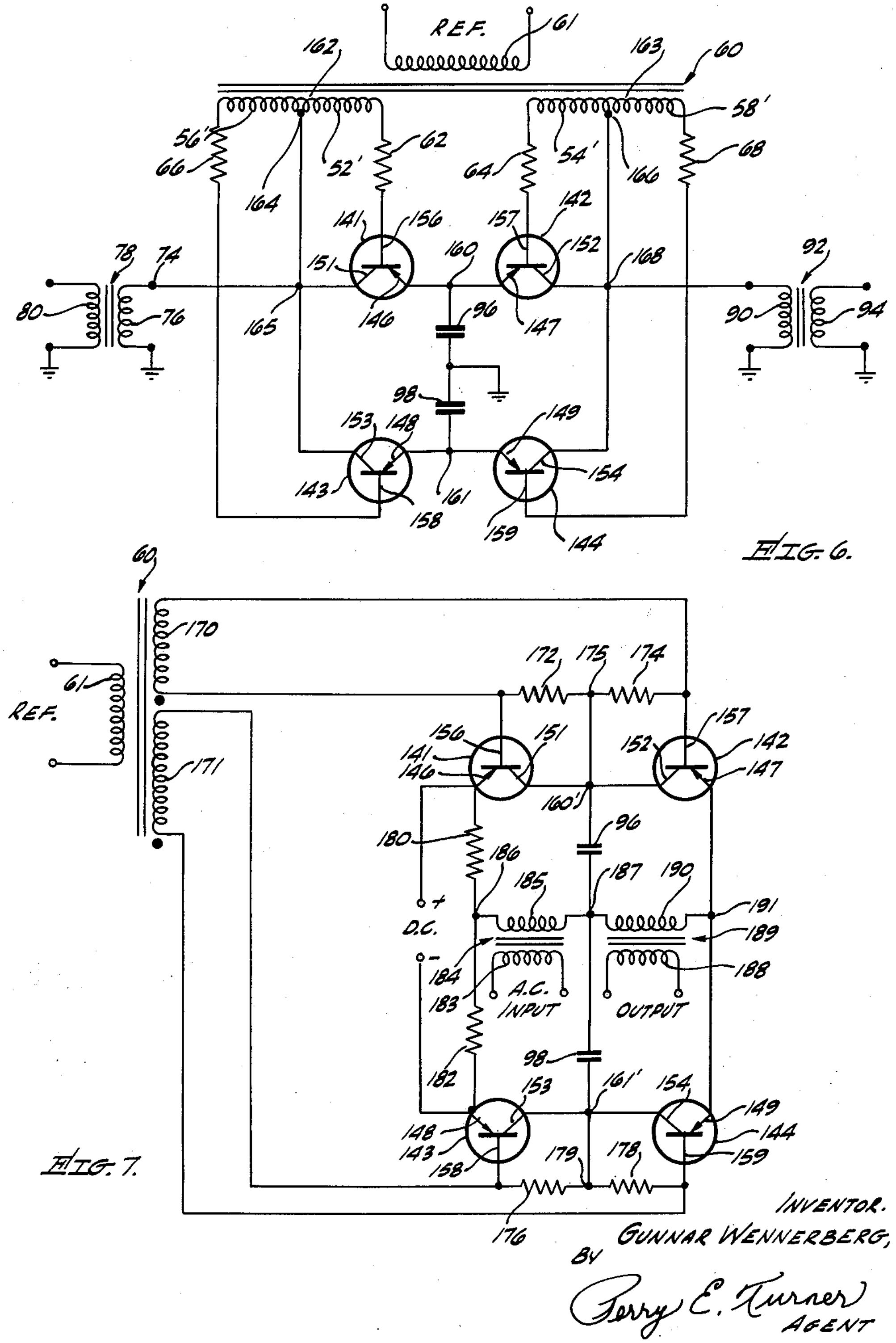
Figure 8A:
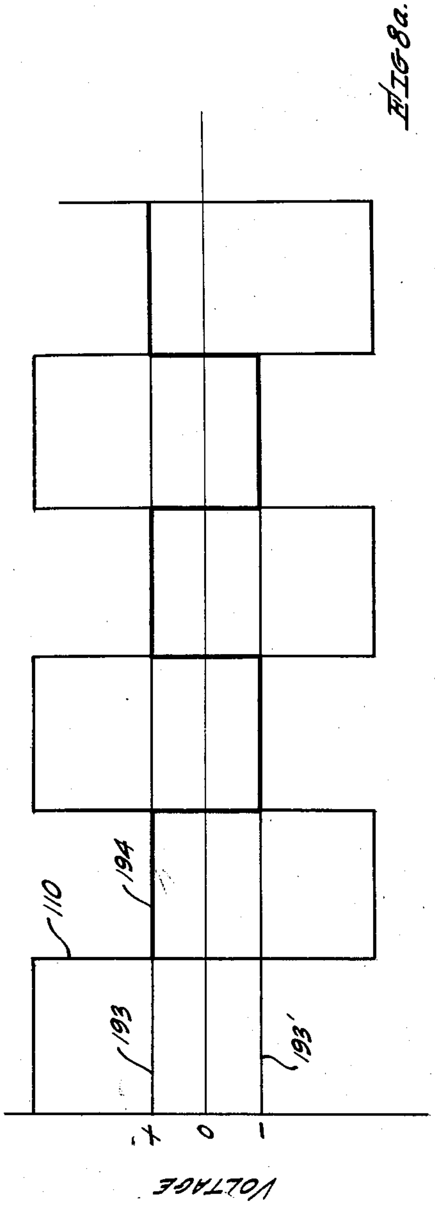
Figure 8B:
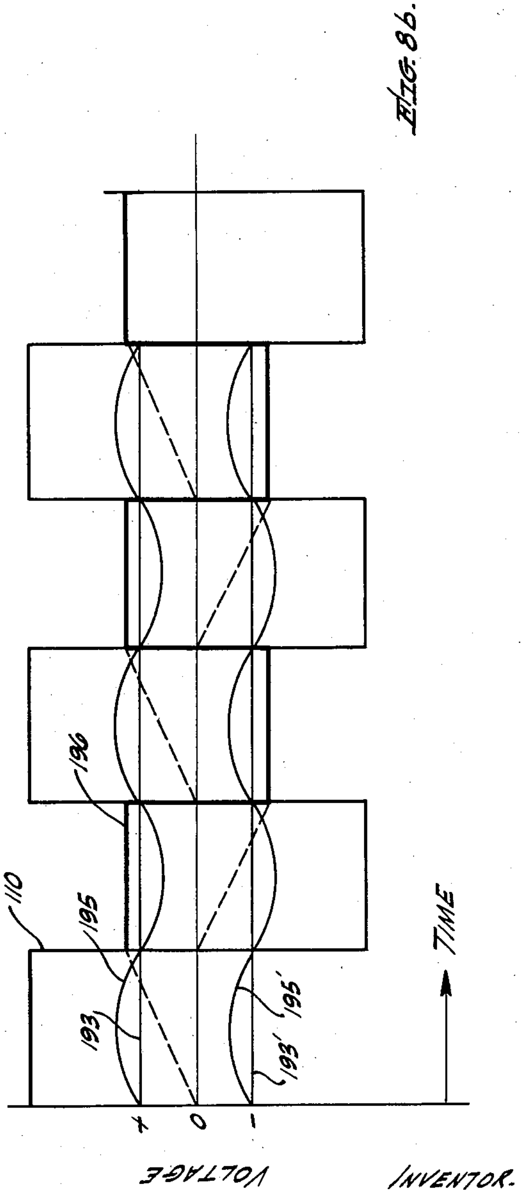

Fig. 6 is a schematic diagram of a quadrature stripping network employing transistors, further in accordance with this invention, Fig. 7 is a schematic diagram illustrating a modification of the network of Fig. 6 for developing a square wave output in response to either an A.-C. or D.-C. input, also in accordance with this invention, and Figs. 8*a* and 8*b* illustrates waveforms to aid in explaining the operation of the circuit of Fig. 7.

Referring to Fig. 1, a plurality of unilaterally conductive electron devices, illustrated as diodes, are arranged in four sets 10, 12, 14 and 16. The diode sets include two pairs of diodes each, 20—22 and 24—26, 28—30 and 32—34, 36—38 and 40—42, and 44—46 and 48—50. The diodes of each pair are connected in series, and the pairs in each set are arranged in parallel, with the diodes of one pair being in back-to-back relationship with the other pair. As illustrated, the sets 10, 12, 14, 16 are connected between the terminals of respective secondary windings 52, 54, 56, 58 of a transformer 60, and in series with respective resistors 62, 64, 66, and 68 which serve as current-limiting means.

The junctions 70, 72 of the respective pairs of diodes 20—22 and 36—38 of two sets 10, 14 are connected together and to one terminal 74 of the secondary winding 76 of an input transformer 78, to the primary winding 80 of which cyclical voltages may be applied. As indicated, one terminal of each of primary and secondary windings 76, 80 is connected to a point of reference or ground potential. In a similar manner, the junctions 86, 88 of respective pairs of diodes 32—34 and 48—50 of sets 12, 16 are connected together and to the primary winding 90 of an output transformer 92, the secondary winding 94 of which may be coupled to a square wave utilization device (not shown). The two storage elements, represented as capacitors 96, 98, are respectively connected between ground and the junctions 100, 102 of diode pairs 24—26, 28—30 and junctions 104, 106 of diode pairs 40—42, 44—46.

Reference will be made to Fig. 2 along with Fig. 1 in describing the operation of the circuit of Fig. 1. A reference or gating voltage 110 of fixed frequency, e.g., 400 cycles per second, is applied to the primary winding 61 of transformer 60. Reference voltage 110 is illustrated as a square wave voltage; this form is preferred, but it will become apparent that reference voltages of different waveforms, e.g., sinusoidal, could also be used. The secondary windings 52, 54, 56, 58 are so poled that on one half cycle of the reference voltage, the diode sets 10 and 16 are conducting and the diode sets 12 and 14 are non-conducting. On the succeeding half cycle, the diode sets 10 and 16 are non-conducting and the diodes of sets 12 and 14 are conducting.

The operation of the above circuit is based upon the fact that when a diode set is conducting, the respective junctions of the two pairs of diodes are at the same potential. For example, considering the sets 10, 12 during conduction of set 10, diode pairs 20—22 and 24—26 form parallel paths between which current flow through secondary winding 56 and resistor 66, due to the reference voltage 110, is split. Thus, assuming the diodes are of the same type, junctions 70 and 100, being the midpoints of the respective paths, will be at the same potential. Upon application of a signal voltage of the fixed frequency to transformer 78, and hence junction 70, the components in phase with the reference voltage also appear at junction 100, whereupon capacitor 96 receives a corresponding net charge. Since diode 12 is non-conducting, this charge is retained on capacitor 96. On the succeeding half cycle of the reference voltage, when set 10 is then cut off and set 12 rendered conducting, the junctions 102, 86 are placed at the same potential, for the reasons above explained. Thereupon, the charge on capacitor 96, which appears at junction 102, also appears at junction 86 and is applied to the output transformer 92.

To further the understanding of the operation of the invention, attention is directed to Fig. 2, wherein dotted curve 112 represents the signal voltage from the input transformer 78, which is of the same frequency as reference voltage 110. This signal voltage is illustrated as composed of a sinusoidal component 114 which is in phase with reference voltage 110, and a quadrature component 116. During the positive half cycle of the reference voltage 110, capacitor 96 builds up a net charge, along a path generally represented by the dotted line 118, which represents the average value of the in-phase component 114. During the succeeding negative half cycle of the reference voltage, the charge on capacitor 96 is transferred to the output transformer 92. As illustrated, the charge on capacitor 96, which is indicated at 120, constitutes a positive voltage representing the average value of the in-phase component 114.

The charge on capacitor 96 is not affected by the quadrature component 116. As will be readily observed, the equal positive and negative portions of this quadrature component will have a net effect of zero on the charge on capacitor 96. Thus, the circuit simply ignores or is insensitive to the quadrature component.

Meanwhile, while capacitor 96 is discharging, a charge of equal magnitude but opposite sense is being built up on capacitor 98, along a path generally indicated by the dotted line 122. This charge is delivered to output transformer 92, during conduction of diode set 16, as a negative voltage 124 of magnitude corresponding to the average value of the in-phase component 114. The quadrature component 116 does not affect the charge on capacitor 98, for the reason above explained. Thus, the positive and negative voltages 120, 124 together provide a square wave voltage applied to output transformer 92, to be utilized as desired.

From the foregoing it will be apparent that the above described circuit ignores or is insensitive to quadrature components, in contrast to prior art circuits, such as so called "quadrature bridge" networks, which must be selectively adjusted to minimize quadrature components of predetermined magnitudes, and filter circuits, which effect attenuation of quadrature components only to the extent for which they are designed.

As previously mentioned, the above circuit is also unaffected by waveform variations in the input signals. This condition is illustrated in Fig. 3, wherein curve 130 illustrates a cyclical signal voltage in phase with the reference voltage 110, such signal having a wave form which departs from a sinusoidal wave form as indicated. It will be readily apparent from the foregoing that charges built up on the respective capacitors 96, 98 will represent the average value of the respective half cycles of the varying voltage 130, whereupon positive and negative voltages, indicated at 120′ and 124′, are alternately applied to the output transformer 98 to form a square wave input thereto.

It will also be noted that the system is insensitive to amplitude fluctuations in the line or reference voltage. As long as the amplitude of the reference voltage is greater than the input signal, the junctions of each diode set will be placed at the same potential on alternate half cycles, and the capacitors will be accurately charged and discharged in accordance with the in-phase signal components.

For maximum effectiveness of the above operation, transformer 78 is a relatively low impedance device, and transformer 92 is a high impedance device. Further, the input signal voltages are of the same frequency as the reference voltage. Also, the reference voltages appearing across the secondary windings 52, 54, 56, 58 are greater than the signal voltages appearing across the secondary winding 76 of input transformer 78. In this latter connection, the reference voltage applied to the output diode sets 12, 16 may be much lower than those applied to the input diode sets 10, 14. The reason will be apparent from a study of Fig. 2, i.e., the output diode sets 12, 16 accommodate only the charge voltages 120, 124, which are much smaller in magnitude than the signal voltage 112 applied from input transformer 78 to diode sets 10, 14. Thus, by way of example, transformer 60 may be designed so that 60-volt peak reference voltages appear across secondary windings 52, 56 to enable diode sets 10, 14 to accommodate signal voltages of, say, 40 volts, and 30-volt peak reference voltages appear across secondary windings 54, 58 to enable diode sets 12, 16 to accommodate charge voltages of, say, 20 volts. The actual voltages would of course be dictated by the maximum values of the signal and charge voltages which will be known to occur for the particular use to which the circuit would be put.

The value of the above circuit in a servo amplifier system will be instantly apparent. If two or more voltages are combined, in the manner previously indicated, and applied to input transformer 78, any quadrature component will be effectively stripped from the composite signal, and the magnitude of the square wave output voltage will accurately represent the phase relationship of the signals. Further, although variations may exist in the waveform of the composite signal, the square wave output voltage will accurately represent the average value thereof.

An important advantage of the circuit of this invention is that the total delay in developing the square wave is only a half cycle of the signal voltage, e.g., 0.625 millisecond for an input signal of 800 c.p.s. This contrasts sharply with prior arrangements requiring filtering to obtain significant quadrature rejection. Filtering which aids in reasonable quadrature rejection may result in an output voltage which lags the cyclical input signal by many cycles; for example, for signals of 800 c.p.s. an RC filter to effect a 100:1 attenuation of quadrature components, and employing a resistor of 20,000 ohms and a capacitor of 1.0 microfarad capacitance, would result in the output voltage lagging the input signal by 12.5 milliseconds, i.e., a delay of ten (10) full cycles of the signal voltage.

It will be recognized that each diode set above described is simply a switching means. Other switching arrangements could be utilized. For example, and referring to Fig. 4, the diodes 24—26 of set 10 could be replaced with equal resistors 132, 134. Since the same voltage drop exists across the parallel paths comprising the series diodes 20—22 and series resistors 132—134, the mid-points of both paths, i.e., junctions 70 and 100, will be at the same potential when the polarity of the reference voltage is proper for effecting conduction of diodes 20—22. Again, therefore, any signal voltage appearing at junction 70 will also appear at junction 100. One difference here, of course, is that during conduction of diodes 20—22, the resistors 132—134 constitute high impedances for signal paths, and cause insertion loss which is high compared to the extremely low insertion loss associated with an arrangement of two pairs of diodes as in Fig. 1. Such insertion loss, however, may be maintained at a tolerable level by proper choice of resistors 132—134, e.g., resistors having of the order of 1,000 or 2,000 ohms resistance. If some insertion loss can be tolerated, such an arrangement permits the circuit to be constructed with half the number of diodes used in the circuit of Fig. 1.

Fig. 5 illustrates still another arrangement wherein the diodes 22, 26 of set 10 are replaced by resistors 136, 138. Junctions 70, 100 here are not at the mid-points of the two paths, but are located at the same points in the respective paths; therefore, they are at the same potential when the diodes 20, 24 are conducting. In this arrangement, in contrast to the arrangements of Figs. 1 and 4, junctions 70, 100 are conductively connected to the reference voltage source during both portions of the reference voltage. For this reason, resistors 136, 138 are large, e.g., of the order of 0.2 megohm each, to provide high impedance connections between the associated secondary winding and the junctions. Thus, although junction 100 is conductively connected to junction 70 at all times, a low impedance path for the signals is provided via the diodes when they are conducting, and a high impedance path through resistors 136, 138 when the diodes are non-conducting. Under certain conditions, where small leakage losses may be tolerated, such an arrangement represents another possibility where half the number of diodes in the circuit of Fig. 1 can be dispensed with.

In the switching arrangement of Fig. 5, since the diodes are not serially connected, resistors 136, 138 also serve as current-limiting devices, whereby the current-limiting resistor 66 (see Fig. 1) can be eliminated.

Fig. 6 illustrates an arrangement wherein the switching means comprise P-N-P junction transistors 141, 142, 143 and 144, which have respective emitter electrodes 146, 147, 148, 149, collector electrodes 151, 152, 153, 154 and base electrodes 156, 157, 158, 159. The emitter electrodes 146, 147 are connected together, as are emitters 148, 149, and their respective junctions 160, 161 are connected to capacitors 96, 98. Transformer 60 is provided with the center-tapped secondary windings 162, 163. The halves 52′, 56′ of secondary winding 162 correspond to secondary windings 52, 56 of Fig. 1, and are connected respectively between the collector and base electrodes 151, 156 of transistor 141 and the collector and base electrodes 153, 158 of transistor 143, whereby the center-tap 164 and collectors 151, 153 are connected to a common junction point 165. The secondary winding 76 of input transformer 78 is coupled to junction point 165. Current-limiting resistors 62, 66 are connected between the base electrodes 156, 158 and the respective end terminals of secondary winding 162.

Similarly, the respective halves 54′, 58′ of secondary winding 163 are connected between the collector and base electrodes 152, 157 of transistor 142 and the collector and base electrodes 154, 159 of transistor 144. The center-tap 166 and collectors 152, 154 are connected together to provide a common junction point 168, to which the primary winding 90 of output transformer 92 is coupled.

The conditions of operation are the same as for the circuit of Fig. 1, in that the magnitude of the reference voltage is greater than the signal voltages, the transistors 141 and 142, and also transistors 143, and 144, are rendered alternately conducting, and transistors 141 and 143 conduct alternately. It has been found that each transistor will conduct when its base draws sufficient current, and under these circumstances the emitter of such transistor is placed at the same potential as its collector. It is believed this results because the positive potential at the base electrode, with respect to the collector, effectively short circuits the barrier layer between the emitter and collector electrodes. Thus, on the half cycle of the reference voltage when transistor 141 conducts, any inphase component of a signal appearing at junction point 165 also appears at junction point 160, whereby capacitor 96 is charged as previously explained. On the succeeding half cycle of the reference voltage, transistor 142 conducts, and the charge on capacitor 96 is applied to junction point 168 and to the primary winding 90 of output transformer 92. Similarly, transistors 143, 144 cooperate to charge and discharge capacitor 98, whereby a square wave voltage is applied to transformer 92 in the manner of the circuit of Fig. 1.

Fig. 7 illustrates a modification of the circuit arrangement of Fig. 6, wherein both A.-C. and D.-C. input voltages are utilized to develop a square wave output voltage. In this arrangement, the base electrodes 156, 157 of transistors 141, 142 are connected between the end terminals of one secondary winding 170 of transformer 60, and the base electrodes 158, 159 of transistors 143, 144 are connected between the end terminals of a separate secondary winding 171. The collector electrodes 151, 152 are connected together to provide a common junction point 160′, to which capacitor 96 is coupled; similarly, collector electrodes 153 and 154 are connected together to provide a common junction point 161′, to which capacitor 98 is coupled. Also connected between base electrodes 156, 157, and across the end terminals of secondary winding 170, is a pair of resistors 172 and 174, the junction 175 of which is directly connected to junction point 160′; in a similar manner, a pair of resistors 176 and 178 connected between base electrodes 158 and 159 have their junction 179 directly connected to junction point 161′. The emitters 146, 148 of transistors 141, 143 are resistively connected, as through a pair of resistors 180, 182, which have equal values of resistance. The emitters 147, 149 of transistors 142, 144 are directly connected together.

The positive and negative terminals of a D.-C. source are connected directly to the emitter electrodes 146, 148 of transistors 141, 143, to provide means for applying a D.-C. signal voltage to the circuit. Cyclical signal voltages are applied through the primary winding 183 of a transformer 184 which has its secondary winding 185 connected between the junction 186 of resistors 180, 182 and the junction 187 of capacitors 96, 98. Output signals are received by the secondary winding 188 of a transformer 189 which has its primary winding 190 connected between the junction 187 of capacitors 96, 98 and the junction 191 between the emitter electrodes 147, 149 of transistors 142, 144.

It will be noted that the emitter and base electrode connections in Fig. 7 are the reverse of those illustrated in Fig. 6. In this connection, it has been found that the circuits will operate satisfactorily whether the emitter electrodes or the collector electrodes of the pairs of transistors 141—142, 143—144 are directly connected.

In the operation of the circuit of Fig. 7, the secondary windings 170, 171 are poled, as indicated, so that the reference potentials at the base electrodes 156, 159 of transistors 141, 144 are of opposite polarity to the potentials at the base electrodes 157, 158 of transistors 142, 143. As in the case of the transistors of Fig. 6, the emitters and collectors of the transistors will be at the same potential when their base electrodes are positive with respect to their collectors. Thus, when an A.-C. voltage is applied to transformer 184 while transistor 141 is conducting, the in-phase components thereof will be transferred from emitter 146 to junction point 160' to charge capacitor 96, and this charge is subsequently transferred through transistor 142, when it conducts, to appear across primary winding 190; capacitor 98 is similarly charged and discharged, whereby a square wave output voltage is provided in the manner of the circuits of Figs. 1 and 6.

Fig. 8*a* illustrates the operation of the circuit of Fig. 7 in the presence of a D.-C. voltage alone. In the arrangement of Fig. 7, the D.-C. voltage appears at the emitter 146 of one input transistor 141 as a positive voltage 193, and at the emitter 148 of the other input transistor 143 as a negative voltage 193'. Since transistors 141 and 143 are rendered alternately conducting by the reference voltage 110, the charge built up on capacitor 96 during the positive half cycle of the reference voltage will be applied through transistor 142 to output transformer 189 during the following or negative half cycle of the reference voltage. During such negative half cycle, capacitor 98 will be charged through transistor 143, which charge is applied through transistor 144 to the output transformer during the succeeding positive half cycle of the reference voltage. The result, as illustrated in Fig. 8*a*, is a square wave output voltage 194, the amplitudes of the half cycles of which are equal to half the voltage of the D.-C. source.

Fig. 8*b* illustrates the operation of the circuit of Fig. 7 when both A.-C. and D.-C. voltages are applied. In this situation, as will be apparent from inspection of the arrangement of input transformer 184, a cyclical input signal will appear at emitters 146 and 158 as cyclical signals 195, 195' superimposed upon the positive and negative D.-C. voltages 193, 193'. Therefore, in the presence of cyclical input voltages which are sinusoidal and in phase with the reference voltage, as illustrated, capacitor 96 during conduction of transistor 141 will be charged to a value representing the sum of the positive D.-C. voltage 193 and the average value of the positive half of the A.-C. signal 195, and capacitor 98 during the following negative half cycle of the reference voltage will receive a charge corresponding to the sum of the negative D.-C. voltage 193' and the negative half of the A.-C. signal 195'. Thus, a square wave output voltage 196 will be obtained, the magnitude of the half cycles of which are equal to half the applied D.-C. voltage plus the average value of a half cycle of the A.-C. signal.

Although each of the circuits of Figs. 1, 6 and 7 have been illustrated and described for the production of a cyclical or square wave output voltage, it will be apparent that either the switching devices coupled to capacitor 96, or those coupled to capacitor 98, may be employed to produce unidirectional voltage pulses on either the positive or negative halves of the reference voltage. If such is done, it will of course be necessary to replace the inductive load presented by the output transformer with a resistive or capacitive load (not shown) in accordance with well known principles.

Although P-N-P junction transistors are illustrated and described, it should be noted that N-P-N transistors could be employed, in which case the potentials would be reversed.

Finally, it should be noted that capacitors 96, 98 are merely representative as storage elements, and that other storage elements, e.g., inductors, could be used. If inductor storage elements were used, respective high and low impedance circuit means would of course be employed for the input and output circuit means.

For the foregoing, it will be apparent that this invention provides an improved quadrature stripping network employing switching means for charging and discharging a capacitor to obtain a square wave voltage in response to A.-C. or D.-C. signals, and in which a square wave voltage in the presence of A.-C. signals lags such signals by only a half cycle thereof.

What is claimed is:

1. A quadrature stripping network comprising first and second switching devices, each of said switching devices having input and output terminals, the respective output terminal and input terminal of said first and second switching devices being directly connected to provide a common junction point, a storage element connected between said common junction point and a point of reference potential, a source of reference voltage of predetermined frequency, means coupling said first and second switching devices to said source for rendering said switching devices alternately conducting, means for applying cyclical input signals of said predetermined frequency between the input terminal of said first switching device and said point of reference potential, said output terminal of said first switching device being at the same potential as its input terminal during conduction thereof to effect storage of energy in said storage element in the presence of input signal components in phase with the reference voltage, the output terminal of said second switching device being at the same potential as its input terminal during conduction thereof, whereby any energy stored in said storage element is transferred to the output terminal thereof, and utilization means coupled to said output terminal.

2. The quadrature stripping network defined in claim 1, in which said first and second switching devices each include first and second pairs of serially connected unidirectionally conductive elements, the first and second pairs of unidirectional conductive elements of each switching device being connected in parallel and in back-to-back relation with respect to each other, and the input and output terminals of each switching device being the respective junctions of the first and second pairs of unidirectional conductive elements thereof.

3. The quadrature stripping network defined in claim 1, in which the first and second switching devices comprise first and second transistors each having emitter, collector and base electrodes, said reference voltage source being coupled between the base electrode and one of the remaining electrodes of each transistor, said ones of the remaining electrodes of said transistors being the respective output and input terminals of said first and second switching devices, and the other of the remaining electrodes of said transistors respectively being the input and output terminals of first and second switching devices.

4. The quadrature stripping network defined in claim 1, in which said first and second switching devices each include first and second pairs of serially connected circuit elements in parallel, the first pair of circuit elements of each switching device including two diodes, the second pair of circuit elements of each switching device including a pair of resistors, said resistors having equal values of resistance, the junctions of the pairs of diodes forming the input terminals of said switching devices, and the junctions of the pairs of resistors forming the output terminals of said switching devices.

5. The quadrature stripping network defined in claim 1, in which the first and second switching devices each include a parallel arrangement of two pairs of circuit elements, each pair of circuit elements including a diode and a resistor connected in series, said resistors having equal values of resistance, the diodes in each parallel arrangement being in back-to-back relation, the junction of the diodes and resistors of each switching device forming the input and output terminals thereof, and said resistors presenting high impedance paths to signals during non-conduction of the diodes associated therewith.

6. A quadrature stripping network comprising first and second unidirectionally conductive switching devices, means to apply a cyclical reference voltage of predetermined frequency to said switching devices to render them alternately conducting, each of said switching devices having an input terminal and an output terminal, the respective output terminal and input terminal of said first and second switching devices being directly connected to provide a common junction point, a capacitor storage element connected between said common junction point and a point of reference potential, the output and input terminals of the respective switching devices being at the same potential during conduction thereof, means to apply input signals of said predetermined frequency between the input terminal of said first switching device and said point, the capacitor during conduction of said first switching device receiving a charge corresponding to the average values of only the components of the input signals that are in phase with the reference voltage, and said second switching device during conduction thereof effecting transfer to the output terminal thereof of the charge on said capacitor.

7. A quadrature stripping network comprising first, second, third and fourth switching devices each having input and output terminals, a source of cyclical reference voltage of predetermined frequency, said switching devices being coupled to said source, control means effecting simultaneous conduction of said first and fourth switching devices on one half cycle of the reference voltage and of said second and third switching devices on the succeeding half cycle of the reference voltage, a first capacitor connected between a point of reference potential and the respective output and input terminals of said first and second switching devices, a second capacitor connected between said point of reference potential and the respective output and input terminals of said third and fourth switching devices, each of said switching devices being characterized in that the output and input terminals thereof are at the same potential during its conduction, means to apply a cyclical input signal between said point of reference potential and the input terminals of said first and third switching devices, and output circuit means coupled to the output terminals of said second and fourth switching devices.

8. The quadrature stripping network defined in claim 7, in which said switching devices each include first and second pairs of serially connected diodes, said first and second pairs of diodes being connected in a parallel circuit and being in back-to-back relation in said circuit, said control means applying the reference voltage across said parallel circuit, whereby during one half cycle of the reference voltage currents flow through said first and second pairs of diodes simultaneously to place the respective junctions of said pairs of diodes at the same potential, said junctions of said first and second pairs of diodes forming the input and output terminals of the switching device, and said control means maintaining the reference voltage across said first and third switching devices at a level exceeding the peak value of the input signals and across said second and fourth switching devices at a level exceeding the magnitude of any charge appearing on said first and second capacitors.

9. The quadrature stripping network defined in claim 7, in which said switching devices each include a transistor having emitter, collector and base electrodes, said control means applying the reference voltage between the collector and base electrodes of each switching device, said collector and emitter electrodes of each switching device forming the input and output terminals thereof, and said control means maintaining the reference voltage between the base and collector electrodes of said first and third switching devices at a value exceeding the peak value of the input signals and between the base and collector electrodes of said second and fourth switching devices at a value exceeding any charges on said first and second capacitors.

10. The quadrature stripping network defined in claim 9, in which said emitter and collector electrodes of each switching device respectively form the input and output terminals thereof.

11. The quadrature stripping network defined in claim 9, in which said collector and emitter electrodes of each switching device respectively form the input and output terminals thereof.

12. A quadrature stripping network comprising a pair of switching devices, each device having input and output terminals and characterized in that said terminals are at the same potential when the device is conducting, the output terminal of said first device and the input terminal of said second device being directly connected to provide a common junction point, an energy storage element connected between said common junction point and a point of reference potential, means to apply a cyclical reference voltage of a predetermined frequency to said devices to render them alternately conducting, whereby the input and output terminals of said first device are at the same potential during one half cycle of the reference voltage and the input and output terminals of said second device are at the same potential during the succeeding half cycle of the reference voltage, means to apply a cyclical input signal voltage of said predetermined frequency between the input terminal of said first device and said point of reference potential, said storage element during conduction of said first device receiving energy corresponding to the average value of components of the cyclical input signal voltage which are in phase with the reference voltage, said storage element receiving a net energy change of zero from quadrature components of the input signal voltage, and said second device during conduction thereof transferring the energy stored in said storage element to the output terminal thereof.

13. The quadrature stripping network defined in claim 11, including means to apply a D.-C. voltage to the input terminal of said first switching device, said storage element during conduction of said first switching device receiving energy corresponding to the magnitude and sense of said D.-C. voltage, and said second switching device during conduction thereof transferring the energy from said storage element to the output terminal thereof.

14. In combinaton, first and second switching devices each having first and second terminals between which a controlled voltage may be applied, and input and output terminals, a direct connection between the respective output and input terminals of said first and second switching devices, a storage element connected between said direct connection and a point of reference potential, means for applying a cyclical reference voltage between said point of reference potential and the first and second terminals of said first and second switching devices, said first switching device being characterized in that the input and output terminals thereof are at the same potential during one half cycle of the reference voltage, said second switching device being characterized in that the input and output terminals thereof are at the same potential during the succeeding half cycle of the reference voltage, means coupled to the input terminal of said first switching device to apply thereto a cyclical input signal of the frequency of the reference voltage, and an output circuit coupled to the output terminal of said second switching device.

15. The combination defined in claim 13, in which one of said first and second terminals of each switching device is directly connected to one of the input and output terminals thereof.

References Cited in the file of this patent

UNITED STATES PATENTS

| | | |
|---|---|---|
| 2,584,986 | Clark | Feb. 12, 1952 |
| 2,594,449 | Kircher | Apr. 29, 1952 |
| 2,773,200 | Guggi | Dec. 4, 1956 |
| 2,782,307 | Sivers et al. | Feb. 19, 1957 |
| 2,820,143 | D'Nelly et al. | Jan. 14, 1958 |

OTHER REFERENCES

Publication: "Electronics," February 1956, pp. 178, 180, 182, 184, 186.